(12) United States Patent
Ng et al.

(10) Patent No.: US 9,759,554 B2
(45) Date of Patent: Sep. 12, 2017

(54) APPLICATION SPECIFIC, DUAL MODE PROJECTION SYSTEM AND METHOD

(71) Applicant: OmniVision Technologies, Inc., Santa Clara, CA (US)

(72) Inventors: Sunny Yat-san Ng, San Jose, CA (US); Manuel Lu, Union City, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 542 days.

(21) Appl. No.: 13/958,167

(22) Filed: Aug. 2, 2013

(65) Prior Publication Data

US 2015/0036058 A1 Feb. 5, 2015

(51) Int. Cl.
*H04N 5/74* (2006.01)
*G01B 11/25* (2006.01)
*G09G 3/00* (2006.01)

(52) U.S. Cl.
CPC ......... *G01B 11/2513* (2013.01); *G09G 3/002* (2013.01); *G09G 2310/0205* (2013.01); *Y10T 29/49002* (2015.01)

(58) Field of Classification Search
CPC ...................... Y10T 29/49002; G01B 11/2513
USPC ........................................................ 348/766
See application file for complete search history.

(56) References Cited

U.S. PATENT DOCUMENTS

| | | | |
|---|---|---|---|
| 5,136,397 A * | 8/1992 | Miyashita | H04N 5/7441 315/225 |
| 6,361,171 B1 * | 3/2002 | Ejiri | G03B 21/14 348/744 |
| 7,268,852 B2 | 9/2007 | Kuan et al. | |
| 7,794,090 B2 | 9/2010 | Tan et al. | |
| 2006/0087612 A1 | 4/2006 | Kuan et al. | |
| 2007/0171381 A1 * | 7/2007 | Tan | G03B 21/26 353/69 |
| 2007/0273835 A1 * | 11/2007 | Fan | G03B 21/00 353/7 |
| 2011/0038042 A1 | 2/2011 | Redmann et al. | |
| 2013/0088652 A1 | 4/2013 | Yasui | |

FOREIGN PATENT DOCUMENTS

| | | |
|---|---|---|
| CN | 1532774 A | 9/2004 |
| CN | 101082763 A | 12/2007 |
| EP | 0978801 A1 | 2/2000 |
| JP | 2009-507401 A | 2/2009 |

(Continued)

OTHER PUBLICATIONS

TW Patent Application Serial No. 102134311, Office Action dated Jul. 22, 2015.

(Continued)

*Primary Examiner* — Nguyen Truong (74) *Attorney, Agent, or Firm* — Larry E. Henneman, Jr.; Gregory P. Gibson; Henneman & Associates, PLC (57) ABSTRACT

A projector panel includes pixel display, a display controller, and a pattern generator. The pattern generator is operative to output pixel data indicative of at least one application specific predetermined pattern. In a particular embodiment, the projector panel is a liquid-crystal-on-silicon panel. In another particular embodiment, the projector panel is adapted for selective use in either structured light projection systems or conventional video projection systems.

41 Claims, 7 Drawing Sheets

(56) References Cited

FOREIGN PATENT DOCUMENTS

| JP | 2013-092745 A | 5/2013 |
| KR | 10-2012-0055670 A | 5/2012 |
| TW | 2007 19292 A | 5/2007 |
| TW | I319554 B | 1/2010 |
| TW | 2013/30582 A | 7/2013 |

OTHER PUBLICATIONS

*Optical Metrology of Diffuse Surfaces,* Creath et al., Optical Shop Testing, Copyright 2007, John Wiley & Sons, $3^{rd}$ Edition.
PCT App. Serial No. PCT/US2014/049396, International Search Report and Written Opinion dated Nov. 19, 2014.
CN Patent Application Serial No. 201410054140.7, Office Action dated May 4, 2016.
JP Application No. 2016-515150, Office Action dated May 29, 2017 (with English translation).
Mori, Yasumoto et al.; "High-Speed 3D Measurement System Using DMD-Based Projector for Industrial Applications"; Emerging Digital Micromirror Device Based Systems and Applications IV; SPIE; Bellingham, WA; vol. 8254, No. 1; Mar. 8, 2012; pp. 1-8.
Coggrave, C. R. et al.; "High-Speed Surface Profilometer Based on a Spatial Light Modulator and Pipeline Image Processor"; Optical Engineering; Society of Photo-Optical Instrumentation Engineers; SPIE; Bellingham, WA; vol. 38, No. 9; Sep. 1999; pp. 1573-1581.
EP Patent Application No. 14 832 547.5, Partial Supplementary European Search Report dated Feb. 27, 2017, 9 pages.
TW Patent Application No. 102134311, Office Action dated Feb. 15, 2016.

\* cited by examiner

APPLICATION SPECIFIC, DUAL MODE PROJECTION SYSTEM AND METHOD

BACKGROUND OF THE INVENTION

Field of the Invention

This invention relates generally to application specific projection systems and more particularly to three-dimensional object scanning systems. Even more particularly, the invention relates to structured light scanning systems.

Description of the Background Art

Structured light scanning systems are currently being used to measure the three-dimensional topography of objects. Such systems typically include a computer connected to both a projector (e.g., a liquid crystal on silicon (LCOS) projector) and a camera. During operation, the projector projects a plurality of narrow light bands on a three-dimensional surface or object. From the perspective of the projector, the narrow light bands appear as evenly distributed vertical and/or horizontal stripes. From the perspective of the camera, however, the narrow light bands appear as distorted stripes. The camera captures images of these distorted stripes and sends the image data to the computer for further processing. The computer then uses a series of algorithms that analyze the distortions to generate data indicative of the topography of the three-dimensional surface. Generally, such data is in the form of a two-dimensional array of three-dimensional vector values.

An LCOS projector typically includes an LCOS driver circuit, an LCOS panel (including an array of display pixels), a light source, and optics. The LCOS driver circuit receives video data from the computer and outputs pixel data indicative of narrow stripes. The LCOS panel receives the pixel data and loads it into the pixel array located thereon. The light source projects light that passes through a liquid crystal layer, reflects off of the individual pixels of the array, and passes back through the liquid crystal layer. One or more polarizers modulate the light reflected by individual pixels depending on the amount of polarization rotation induced by the liquid crystal layer, which in turn depends on the voltages asserted on the pixel electrodes. The illuminated micro-display is then focused onto an object/surface via the optics. As a result, the object/surface is illuminated with a series of stripes.

Although current structured light scanning systems provide an effective means to acquire three-dimensional topography data, they also have shortcomings. For example, current systems require a LCOS driver circuit to provide the LCOS panel with pixel data indicative of the narrow light bands. Of course, LCOS drivers are relatively complicated and expensive circuits.

What is needed, therefore, is a LCOS structured light scanning system that is simpler and more cost effective to manufacture than current systems.

SUMMARY

The present invention overcomes the problems associated with the prior art by providing an integrated circuit display device with an on-chip pattern generator. The invention facilitates configuring the on-chip pattern generator to provide application specific display patterns, thereby enabling the construction of application specific projectors that do not require a separate driver circuit for processing video data from an external source. The elimination of the driver circuit results in a significant savings in both cost and complexity.

In an example embodiment, a projector panel includes a pixel array, a pattern generator, and control circuitry, all formed on the same integrated circuit chip. The pixel array includes a plurality of pixels arranged in columns and rows. The pattern generator is operative to output pixel data indicative of at least one predetermined pattern. The control circuitry is operative to assert the pixel data on the pixels of the pixel array to display the predetermined pattern. In the example embodiment, the projector panel is a liquid-crystal-on-silicon panel, and the integrated circuit chip is a reflective silicon backplane.

Although a pattern generator that outputs a single data set corresponding to a single predetermined image, in the disclosed example embodiment, the pattern generator selectively outputs a plurality of pixel data sets, each pixel data set corresponding to a different predetermined display pattern. Optionally, the pattern generator includes non-volatile memory, with the pixel data being stored in the non-volatile memory. Alternatively, the pattern generator can be circuitry that outputs bits of pixel data based on a control algorithm and/or stored operational parameters. For example, the pattern generator can output a predetermined number of 1s (digital high), followed by the same predetermined number of 0s (digital low), followed by the same predetermined number of 1s, and so on until a complete row of data is generated. The predetermined number of 1s and 0s will determine the width of the stripes in the displayed pattern (assuming that the same row of data is written to every row of the display). In this example case, the pixel data indicative of the predetermined pattern (vertical stripes) includes no more than one intensity value for each column of pixels in the pixel array.

One example application specific use of the present invention is in light structure applications. In that case, the at least one predetermined pattern is a structured light pattern. The control circuitry is then operative to assert the pixel data on the pixels of the display by loading a sequence of data bits into a first row of the pixels of the pixel array and by loading the same sequence of data bits into the other rows of pixels of the pixel array during a single frame, thus resulting in a pattern of vertical stripes.

In the example embodiment, the control circuitry is operative to load a single row of data output from the pattern generator into each row of pixels during a single frame time. Optionally, the control circuitry is operative to simultaneously load a single row of data output from the pattern generator into each row of pixels of the pixel array during the single frame. Alternatively, the control circuitry is operative to sequentially load a same single row of data output from the pattern generator into each row of the pixels during a single frame. As another alternative, the control circuitry is operative to sequentially load a same single row of data output from the pattern generator into groups row of the pixels during a single frame, with the rows of each group being loaded with the data simultaneously.

In a particular example embodiment, the projector panel includes a video data input terminal set for receiving video pixel data from an external source. The control circuitry is operative to selectively function in one of a first mode and a second mode. When operating in the first mode (e.g., in an application specific projector), the control circuitry is operative to assert the pixel data from the pattern generator on the pixels of the pixel array. When operating in the second mode (e.g., in a general purpose video projector), the control circuitry is operative to display the video pixel data received via the video data input terminal set. To facilitate use in the second mode, the example projector panel additionally includes a driver interface operative to receive pixel data from a separate liquid-crystal-on-silicon driver. The display can be selectively switched between the first and second mode.

Optionally, the projector panel additionally includes one or more programmable registers for storing operational parameters. For example, one operational parameter at least partially determines whether the control circuitry operates in the first mode or the second mode. Another operational parameter at least partially determines a time duration that the predetermined pattern is displayed by the pixel array. Another operational parameter at least partially determines how many different predetermined patterns can be output by and/or read from the pattern generator. Yet another operational parameter at least partially determines how many times the predetermined pattern is to be displayed by the pixel array during an operational cycle. Additional operational parameters can be included in additional programmable registers, depending on the particular application specific use for which the display panel is intended.

In a particular example embodiment, the projector panel is a liquid-crystal-on-silicon projector panel. The pattern generator includes a non-volatile memory, and the pixel data corresponding to the predetermined patterns is stored in the non-volatile memory. The control circuitry is operative to load a single row of data output from the pattern generator into each of the rows of pixels during a single frame. The projector panel additionally includes programmable registers, a video driver interface, and a camera interface.

An example method for manufacturing a projector panel is also disclosed. The method includes forming a reflective display integrated circuit chip, forming a pattern generator in the reflective display integrated circuit chip, and forming control circuitry in the reflective display integrated circuit chip. The reflective display integrated circuit chip includes a plurality of pixels arranged in an array of columns and rows. The pattern generator is operative to output pixel data indicative of at least one predetermined pattern. The control circuitry is operative to assert the pixel data on the pixels of the reflective display. The method further includes applying a liquid crystal layer over the reflective display integrated circuit chip.

In the example method, the step of forming the pattern generator includes forming non-volatile memory on the reflective display integrated circuit chip and storing the pixel data in the non-volatile memory. In a particular method, the pixel indicative of the at least one predetermined pattern includes no more than one intensity value for each column of pixels in the array. More particularly, the at least one predetermined pattern is a structured light pattern. Additionally, the control circuitry is configured to assert the pixel data on the pixels of the display by loading a sequence of data bits into a first row of the pixels of the pixel array and by loading the same sequence of data bits into the other rows of pixels of the pixel array during a single frame.

An example method includes configuring the control circuitry to load a single row of data output from the pattern generator into each of the plurality of pixel rows during a single frame. Optionally, the control circuitry is configured to simultaneously load a single row of data output from the pattern generator into each of the rows of pixels during a single frame. Alternatively, the control circuitry is configured to sequentially load a same single row of data output from the pattern generator into each of the rows of pixels during a single frame. As another alternative, the control circuitry is operative to sequentially load a same single row of data output from the pattern generator into groups row of the pixels during a single frame, with the rows of each group being loaded with the data simultaneously.

A particular example method includes forming a video data input terminal set on the reflective display integrated circuit chip for receiving video pixel data from an off-chip source. The example method additionally includes configuring the control circuitry to selectively operate in one of a first mode and a second mode, configuring the control circuitry to assert pixel data from the pattern generator when operating in the first mode, and configuring the control circuitry to assert the video pixel data received via the video data input terminal set when operating in the second mode. The example method optionally includes forming at least one programmable register on the reflective display integrated circuit chip and configuring the control circuitry to determine whether the control circuitry operates in the first mode or the second mode depending at least in part on an operational parameter stored in the at least one programmable register.

Optional methods also include forming one or more programmable registers on the reflective display integrated circuit chip and configuring the control circuitry to operate depending at least in part on operational parameters stored in the programmable registers. One such method includes configuring the control circuitry to determine a time duration that the at least one predetermined pattern is displayed on the pixels of the reflective display depending at least in part on an operational parameter stored in at least one of the programmable registers. Another such optional method includes configuring the control circuitry to determine how many different predetermined patterns can be read from the pattern generator depending at least in part on an operational parameter stored in one of the programmable registers. Yet another such method includes configuring the control circuitry to determine how many times the predetermined pattern is to be displayed by the pixels of reflective display during an operational cycle depending at least in part on an operational parameter stored in at least one of the programmable registers.

The disclosed methods optionally include forming an on-chip driver interface operative to receive pixel data from a separate liquid-crystal-on-silicon driver and/or forming a camera interface on the reflective display integrated circuit chip.

A non-transitory electronically readable medium is also disclosed The non-transitory electronically readable medium includes code embodied therein for causing an electronic device to read pixel data corresponding to a predetermined pattern from an on-chip pattern generator and to assert the pixel data on reflective pixel electrodes of an on-chip display.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a projector with display panel including an integrated circuit backplane with an application specific display pattern generator thereon. In the following description, numerous specific details are set forth (e.g. structured light application patterns) in order to provide a thorough understanding of the invention. Those skilled in the art will recognize, however, that the invention may be practiced apart from these specific details. In other instances, details of well-known display panel operation and manufacturing practices (e.g., application of liquid crystal, digital data transfer, circuit timing, etc.) and components have been omitted, so as not to unnecessarily obscure the present invention.

Figure 1:
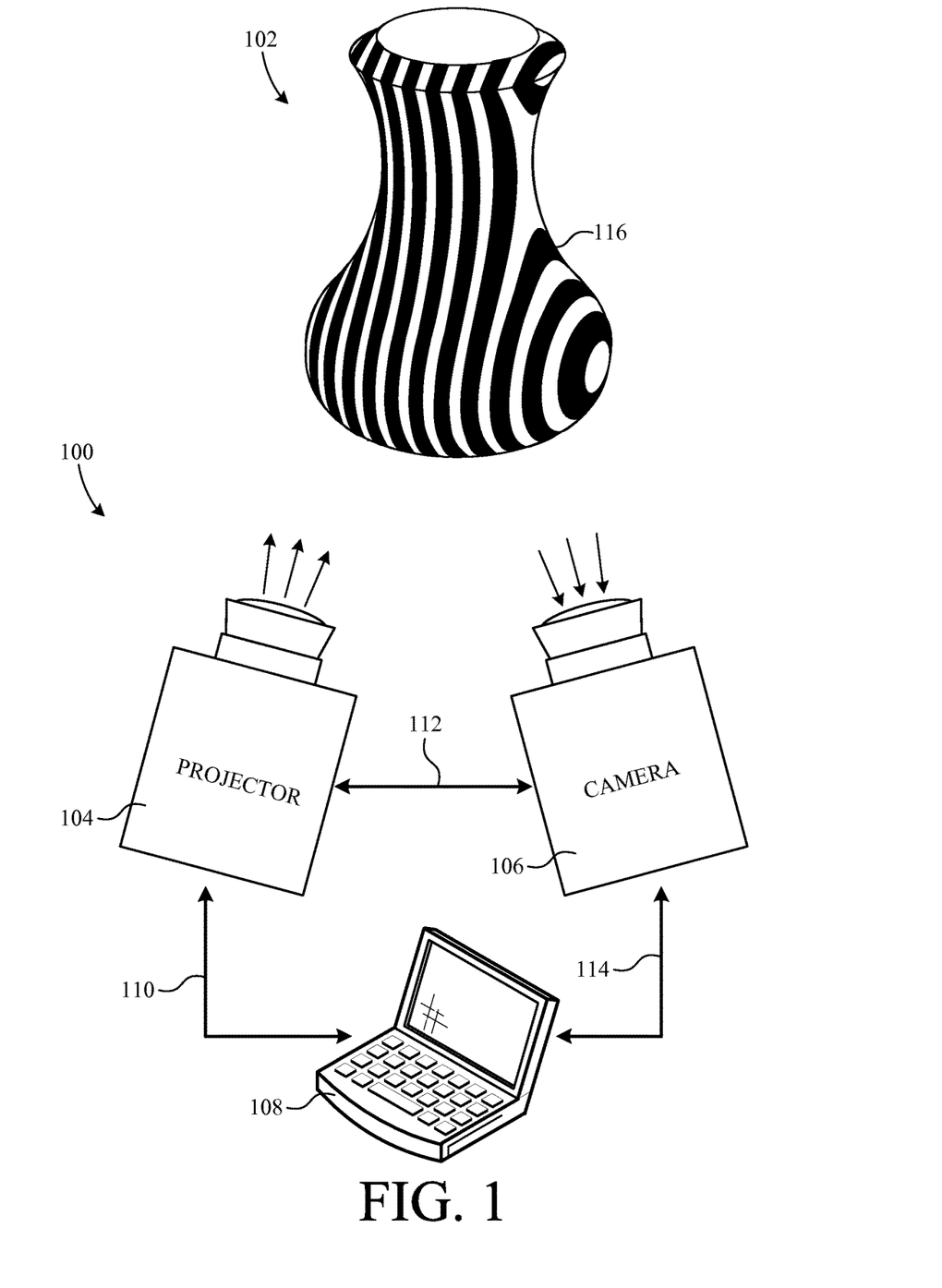
FIG. 1 is a diagram of a structured light system shown scanning the topography of a pot.

FIG. 1 shows a structured light system 100 scanning the topography of a three-dimensional object which, in this example, is a pot 102. Structured light system 100 includes a projector 104, a camera 106, and a computer 108. Projector 104 communicates with computer 108 via a first communication link 110. Furthermore, projector 104 communicates with camera 106 via a second communication link 112. Camera 106 communicates with computer 108 via a third communication link 114. First, second and third communication links 110, 112, and 114 respectively can be any suitable type of connection such as, for example, a wired connection, a wireless connection, etc.

The operation of structured light system 100 is summarized as follows. Projector 104 receives instructions from computer 108, via first communication link 110, instructing projector 104 to project a structured light pattern 116 on pot 102. As shown, structured light pattern 116 is in the form of a plurality of vertical stripes. From the perspective of projector 104, the stripes of structured light pattern 116 are uniformly sized and equally spaced. While structured light pattern 116 is projected on pot 102, camera 106 receives image capture instructions via second communication link 112 and/or third communication link 114. After camera 106 captures an image of structured light pattern 116, the image data is sent to computer 108 via third communication link 114. From the perspective of camera 106, structured light pattern 116 appears distorted in the captured image(s). Computer 108 uses various algorithms to analyze the distortions in the captured image data and to generate data indicative of the three-dimensional topography of pot 102.

In an actual structured light system, projector 104 projects a series of different stripe patterns onto pot 102 over time, and camera 106 captures images of each such pattern. For example, projector 104 can project a series of images each having $2^n$ stripes: image 1 (2 stripes); image 2 (4 stripes); image 3 (8 stripes); . . . ; image (n) ($2^n$ stripes). All of the different images are then analyzed by computer 108 to provide a more detailed model of the surface topography of pot 102.

Figure 2:
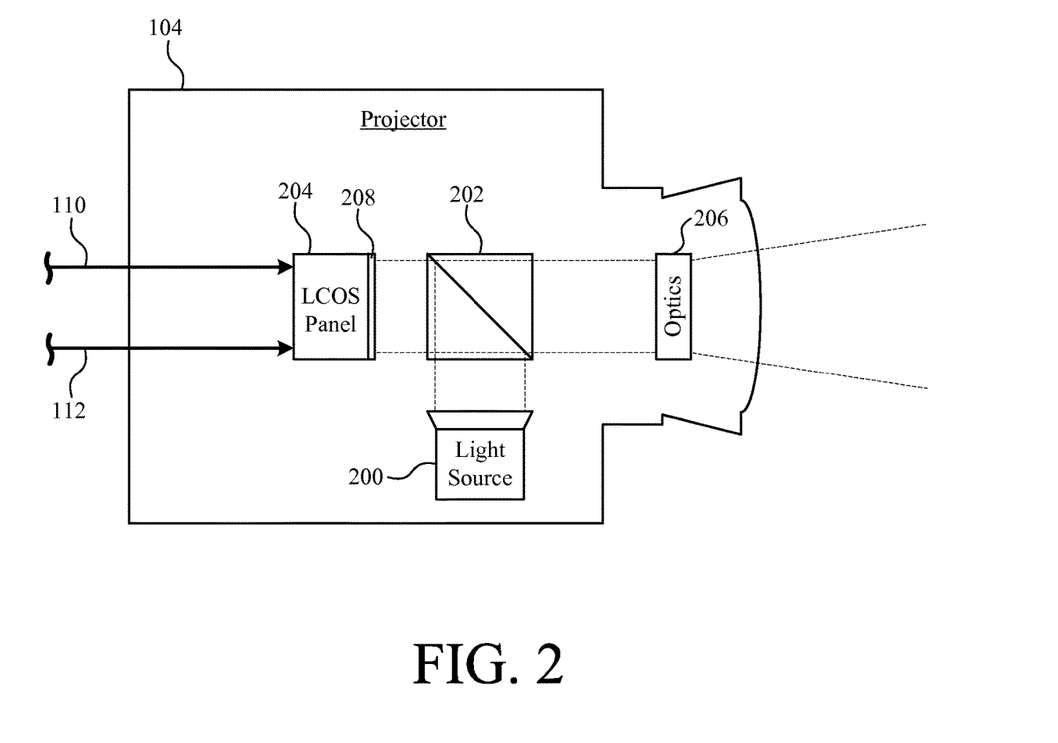
FIG. 2 is a block diagram of the projector of FIG. 1.

FIG. 2 is a diagram showing projector 104 in greater detail. In this example embodiment, projector 104 includes a light source 200, a polarizing beam splitter 202, a liquid-crystal-on-silicon (LCOS) panel 204, and optics 206. During the operation of system 100, LCOS panel 204 receives instructions through first communication link 110 and/or second communication link 112 instructing projector 104 to project structured light pattern 116 on pot 102. Light source 200 illuminates polarizing beam splitter 202. As polarizing beam splitter 202 is illuminated, it redirects polarized light to LCOS panel 204. The polarized light passes through a liquid crystal layer 208 of LCOS panel 204, is reflected off of the pixels of LCOS panel 204, is reflected back through liquid crystal layer 208, through polarizing beam splitter 202, and then through optics 206. Polarizing beam splitter 202 modulates the light based on polarization rotations induced by liquid crystal layer 208. Optics 206 focuses the modulated light to project structured light pattern 116 on pot 102 (FIG. 1).

The elements and arrangement of the components of projector 104 is by way of example only. There are many possible components and arrangements for assembling a projector around a display panel, and all such possibilities are considered to be within the scope of the present invention.

Figure 3:
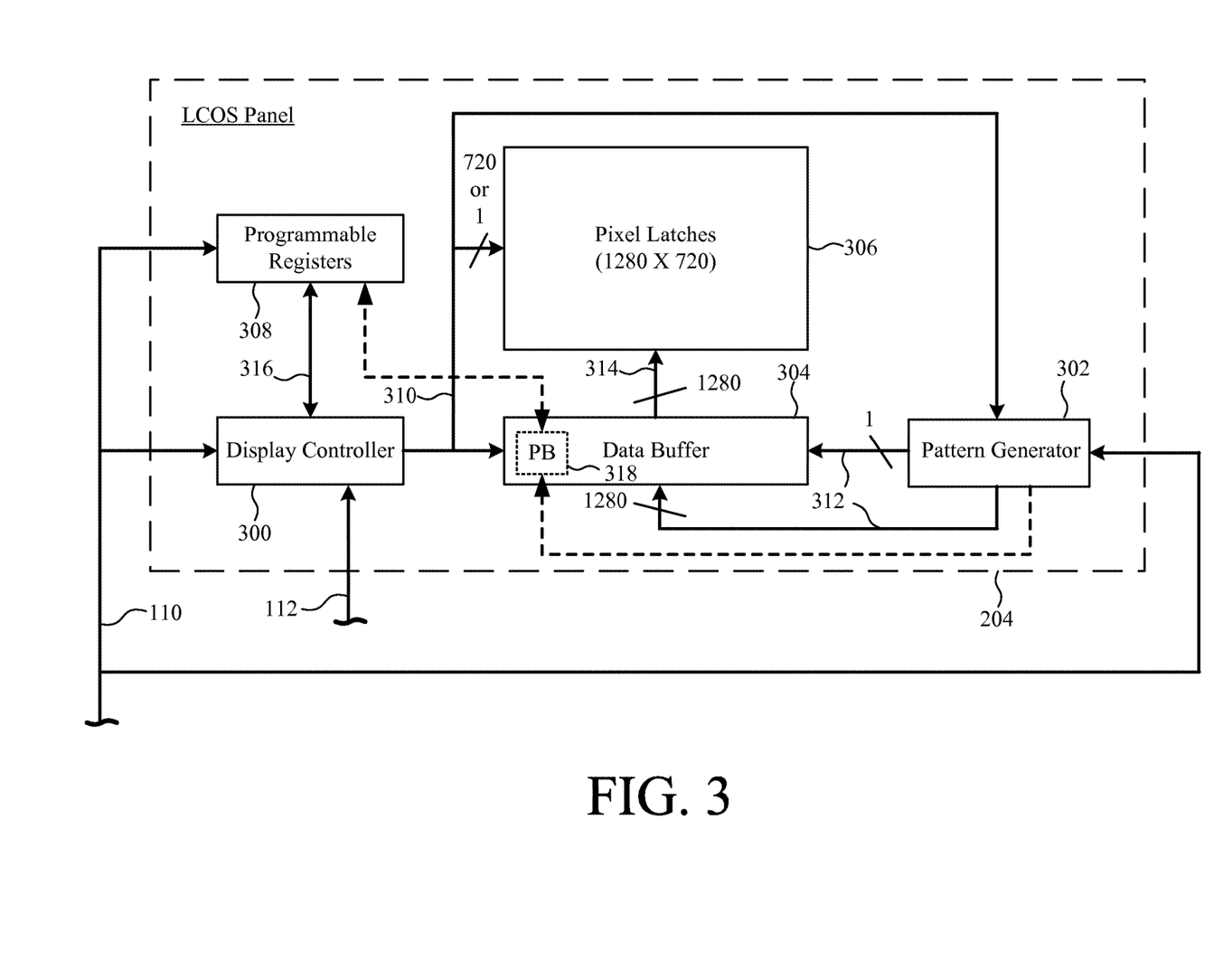
FIG. 3 is a block diagram of the circuitry of a display panel of the projector of FIG. 1.

FIG. 3 depicts LCOS panel 204 according to one embodiment of the present invention. A distinguishing feature of LCOS panel 204 is that it is free of any video data input lines. In other words, LCOS panel does not have any data lines for receiving a stream of video data from an off-chip driver during operation. In this example embodiment, LCOS panel 204 is operative to modulate incident light generate patterns (e.g., structured light pattern 116) based on application specific patterns stored and/or generated on-chip.

LCOS panel 204 includes a display controller 300, a pattern generator 302, a data buffer 304, an array of pixel latches 306 (1280 columns×720 rows), and a set of programmable registers 308. Display controller 300 facilitates the coordination and control of LCOS panel 204. Display controller 300 is communicatively coupled to camera 106 and projector 108 via second communication link 112 and first communication link 110, respectively. Additionally, display controller 300 is coupled to pattern generator 302, data buffer 304, and pixel latches 306 via a set of control lines 310. Pattern generator 302 is operative to generate pixel data that, when loaded into pixel latches 306, displays one or more application specific light patterns. In this example embodiment, the application specific light patterns are structured light patterns 116. Data buffer 304 is operative receive the pixel data from pattern generator 302, via data line(s) 312 and to hold the pixel data until it is loaded into pixel latches 306.

Data lines 312 are shown as two separate sets of data lines to illustrate that pixel data can be transferred from pattern generator 302 to data buffer 304 either serially or in parallel. In particular, a row of pixel data can be shifted into data buffer 304 one bit at a time via a single data line, or can be latched into data buffer 304 in parallel via a set (e.g., 1280) of data lines. Of course, it is not necessary for both sets of data lines (single and 1280) to be provided in a single device.

Each of pixel latches 306 is part of a pixel cell that includes a reflective electrode (not shown). Pixel latches 306 are coupled to receive pixel data from data buffer 304, via data lines 314, and assert the pixel data onto an associated one of the reflective electrodes. The pixel data being asserted on the reflective electrodes causes the modulation of the incident light described above.

Programmable registers 308 include, for example, memory, wherein information such as operational settings/parameters are stored and/or changed. Programmable registers 308 are coupled to display controller 300, via communication lines 316, and display controller 300 operates based at least in part on the operational settings/parameters stored in programmable registers 308. Programmable registers 308 are also coupled to computer 108, via first communication link 110, thus facilitating loading and/or modification of the operational settings/parameters stored therein during an initialization process. Optionally, programmable registers 308 can include non-volatile memory, so that initialization is not necessary.

As another option, programmable registers 308 can retrieve settings from a parameter buffer 318 located in data buffer 304. This feature facilitates the changing of parameters stored in programmable registers 308 during operation. For example, new parameter values can be provided from pattern generator 302 to parameter buffer 318 as new pixel data is loaded into data buffer 304. Then, when the new parameter values are transferred from parameter buffer 318 to programmable registers 308, the display controller 300 will continue operation based on the new parameters. In this way, a preprogrammed series of patterns can include operational mode changes for display controller 300.

The transfer of parameter settings into and out of parameter buffer 318 is shown by dashed arrows in FIG. 3. The parameters can be transferred via dedicated communication lines or via existing control lines and components. For example, display controller 300 can be configured to periodically read the parameters from parameter buffer 318 via control lines 310 and write the parameters to programmable registers 308 via communication lines 316.

The operation of LCOS panel 204 is described as follows. First, display controller 300 asserts instructions on control line 310, causing pattern generator 302 to output a sequence of pixel data bits to buffer 304, via data line 312, corresponding to a predetermined display pattern. In this particular embodiment, because the patterns are vertical stripes, the number of data bits output from pattern generator 302 is equal to the number of columns of pixel latches 306. For example, the number of data bits output from pattern generator 302 is 1280 because there are 1280 columns of pixel latches 306 in the display. Display controller 306 then instructs each row of pixel latches 306 to latch that sequence of data bits, so that each row of pixel latches 306 will have the same sequence of data bits loaded therein. As a result, LCOS panel 204 displays a pattern of vertical stripes when it is illuminated, the pattern in this example being structured light pattern 116. Finally, display controller 300 signals camera 106 and/or computer 108, via second communication link 112 or first communication link 110, that a particular light structure pattern 116 is being projected. This signal facilitates the coordination of pattern projection by projector 104 and image capture by camera 106.

Pattern generator 302 can generate pattern data via any suitable means. For example, pattern generator 302 can simply include non-volatile memory having a predetermined sequence of data bits stored therein. As another example, pattern generator 302 can include circuitry which, when actuated, outputs an alternating sequence of bit values. In other words, each time pattern generator 302 outputs a predetermined number of bits, the value of the bits would invert. For example, pattern generator 302 could output 64 high bits, then 64 low bits, then 64 high bits, then 64 low bits, and so on, to generate stripes that are 64 pixels wide. As another example, pattern generator 302 could use algorithms to output any predetermined sequences of data bits, which would correspond to predetermined patterns to be displayed. As yet another example, pattern generator can include volatile memory that is loaded from external non-volatile memory during start-up/initialization.

In the example embodiment, the capacity of data buffer 304 is 1280×720×4 bits. However, depending on the particular application, data buffer 304 can be much smaller. For example, for structured light applications, data buffer can be as small as one row of data (e.g., 1280×1). As another option, data buffer 304 and pattern generator 302 can be merged into a single memory device. For example, in a structured light application that projects ten different stripe patterns, data buffer 304 and pattern generator 302 can be replaced by a single block of memory (1280×10), which provides one row of memory for each of the ten predetermined stripe patterns.

In embodiments where most or all of the pixel data is stored in data buffer 304, display controller 300 controls the transfer sequence of the pixel data from data buffer 304 to pixel latches 306. For example, display controller 300 can include a pointer to the location in data buffer 304 where the display data starts. The pointer is then incremented as display controller 300 causes the pixel data to be transferred from data buffer 304 to pixel latches 306. After display controller 300 completes the transfer of the entire sequence of pixel data, the pointer is reset to location in data buffer 304 where the display data starts, so that the entire pattern can be repeated.

There are also options for how the pixel data can be written from data buffer 304 to the pixel latches 306. Note that the portion of control line 310 providing control signals to pixel latches 306 is labeled as having either 720 lines or 1 line. These lines represent row enable lines, which carry signals that cause a row of pixels to latch the data being asserted on data lines 314. Where, as in the present example embodiment, all of the rows of pixel latches 306 are written with the same row pixel data, a single signal is sufficient to simultaneously latch the data into every row of the display. Alternatively, a separate row enable line can be provided for each row of the display, so that the data can be sequentially latched into every row of the display. As yet another option, some intermediate number of enable lines can be provided, to sequentially enable groups of rows.

The circuitry shown in block form in FIG. 3 is embodied in an integrated circuit chip. In particular, display controller 300, pattern generator 302, data buffer 304, pixel latches 306, programmable registers 308, control lines 310, data lines 312, data lines 314, and communication lines 316 are all formed in a silicon reflective display backplane. In addition, an array of pixel mirrors (not shown) is formed on the integrated circuit. Each of the pixel mirrors is coupled to a respective one of the pixel latches 306. LCOS panel 204 is completed by attaching a gasket (not shown), liquid crystal layer 208 (FIG. 2), and a transparent common electrode (not shown).

There are several important advantages to incorporating an on-chip pattern generator in LCOS panel 204. One advantage is that pattern generator 302 eliminates the need to receive structured light pattern pixel data from an external driver. As a result, LCOS panel 204 can be used as a structured light pattern projector without using a separate LCOS driver and is, therefore, less complex and less expensive than prior art LCOS panels. Another advantage is that pixel data can be loaded into pixel latches 306 much faster than can be loaded into display memories of prior art LCOS panels. This is because the pixel data is generated directly on LCOS panel 204 rather than on an external driver and need not, therefore, traverse an off-chip interface.

Figure 4:
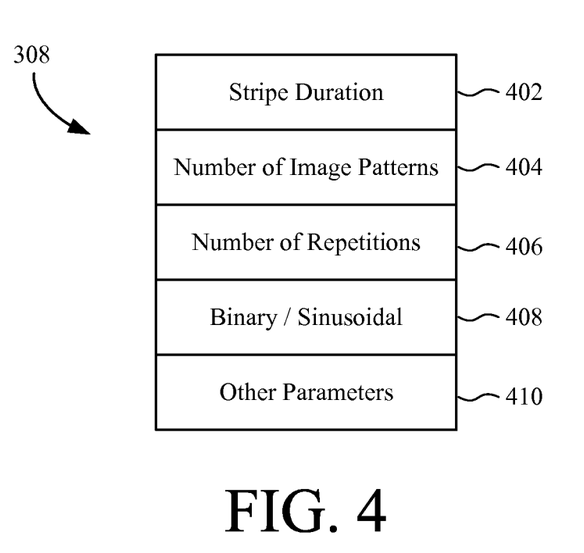
FIG. 4 is block diagram of a programmable register of the display panel of FIG. 3.

FIG. 4 is a block diagram showing programmable registers 308 in greater detail. As described above, operational parameters stored in programmable registers 308 at least partially control the operation of display controller 300. In this particular example, programmable registers include a "stripe duration" register 402, a "number of image patterns" register 404, a "number of repetitions" register 406, a "binary/sinusoidal" register 408, and an "other parameters" register 410. "Stripe duration" register 402 holds a value indicative of the number of frame times that the data bits remain loaded in pixel latches 306 (e.g., how long displayed). "Number of image patterns" register 404 holds a value indicative of the number of different patterns that can be provided by pattern generator 302. "Number of repetitions" register 406 holds a value indicative of the number of times a particular pattern is repeated during an operational cycle. "Binary/sinusoidal" register 408 holds a value indicative of whether a particular pattern is binary (e.g., black and white stripes with distinct edges) or sinusoidal (intensity of the stripes varies across the displayed image). "Other parameters" register 410 is representative in nature and shows that any setting useful for a particular display application can be set and/or modified using one of programmable registers 308.

Figure 5:
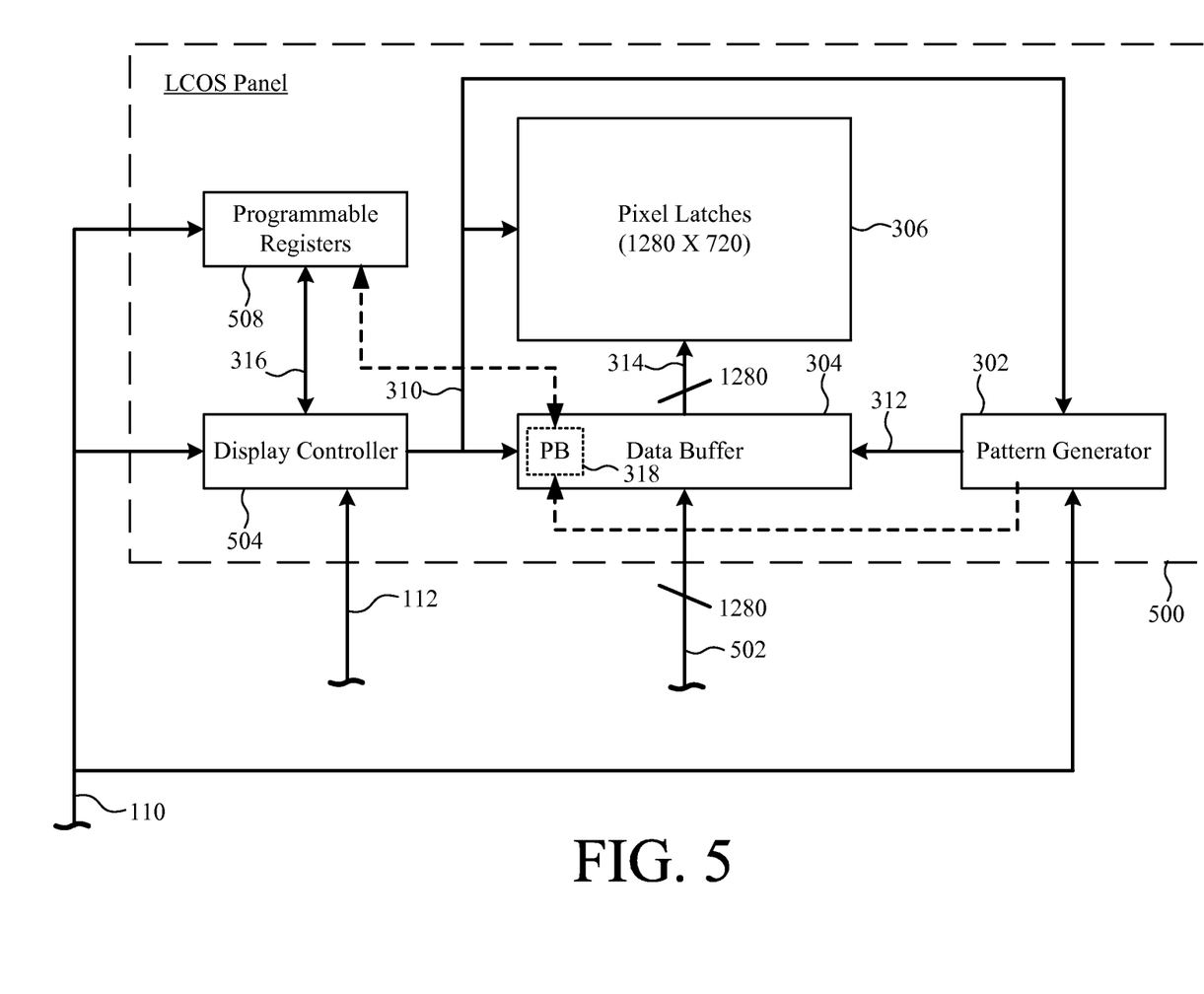
FIG. 5 is a block diagram of the circuitry of an alternate display panel.

FIG. 5 is a block diagram of an LCOS panel 500 according to an alternate embodiment of the present invention. LCOS panel 500 is substantially similar to LCOS panel 204, except that LCOS panel 500 is further adapted to receive pixel data from a driver. Therefore, any components of LCOS panel 500 that are substantially the same as those of LCOS 204 are denoted by like reference numbers and will not be described in detail so as to avoid redundancy.

In this particular embodiment, LCOS panel 500 is shown connected to a data line set 502. As shown, data line set 502 is a 1280 data line set, because pixel latches 306 are arranged in 1280 columns in this example. Thus, an entire row of data can be loaded into data buffer 304 in parallel. In addition, data lines 312 are shown as a single line. However, as explained above, data lines 312 can be a single serial line or a set of 1280 parallel data lines.

Because LCOS panel 500 is adapted to receive video data from an external source (e.g., a separate LCOS driver) and includes pattern generator 302, it can be used in two different ways. In a first mode of operation, LCOS panel 500 can be used solely as a structured light pattern projector (or other application specific projector), such as LCOS panel 204. In a second mode of operation, LCOS panel 500 can be used as a conventional LCOS panel that receives pixel data from a separate off-chip LCOS driver via data line set 502.

Display controller 504 accommodates both modes of operation. In the first mode of operation, display controller 504 operates as described above with reference to FIG. 3, causing display data from pattern generator 302 to be written into pixel latches 306. In the second mode of operation, display controller receives control signals from an LCOS driver (not shown) and causes pixel data asserted on data lines 502 to be latched into data buffer 304 and subsequently transferred to pixel latches 306.

The sizes of the functional blocks shown in FIG. 3 and FIG. 5 are not representative of the relative sizes of the circuitry that they represent. In actuality, the array of pixel latches 306, the overlying pixel mirrors (not shown), and data buffer 304 would occupy a majority of the area and circuitry of the integrated circuit chip. In contrast, pattern generator 302, display controller 504, and programmable registers 508 occupy a relatively small amount of the integrated circuit chip. As a result, a conventional LCOS backplane can be modified to provide the functionality of the present invention with a virtually insignificant increase in size and/or complexity. As described above, the functionality of LCOS panel 204 and/or LCOS panel 500 enables the manufacture of an application specific projector without a separate LCOS driver. The present invention provides this significant savings at an extremely low cost.

Figure 6:
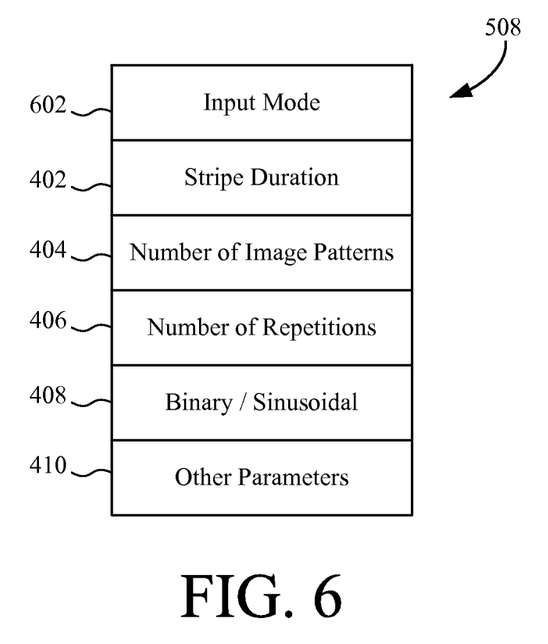
FIG. 6 is block diagram of a programmable register of the display panel of FIG. 5.

FIG. 6 is a block diagram of programmable registers 508. Programmable registers 508 are substantially similar to programmable registers 308, except that programmable registers 508 includes an "input mode" register 602. "Input mode" register 602 holds a value indicative of the selected mode of operation for LCOS panel 500. Responsive to a first value, display controller 504 operates in the first mode, as described above with reference to FIG. 5. Responsive to a second value, display controller 504 operates in the second mode, as described above with reference to FIG. 5.

Figure 7:
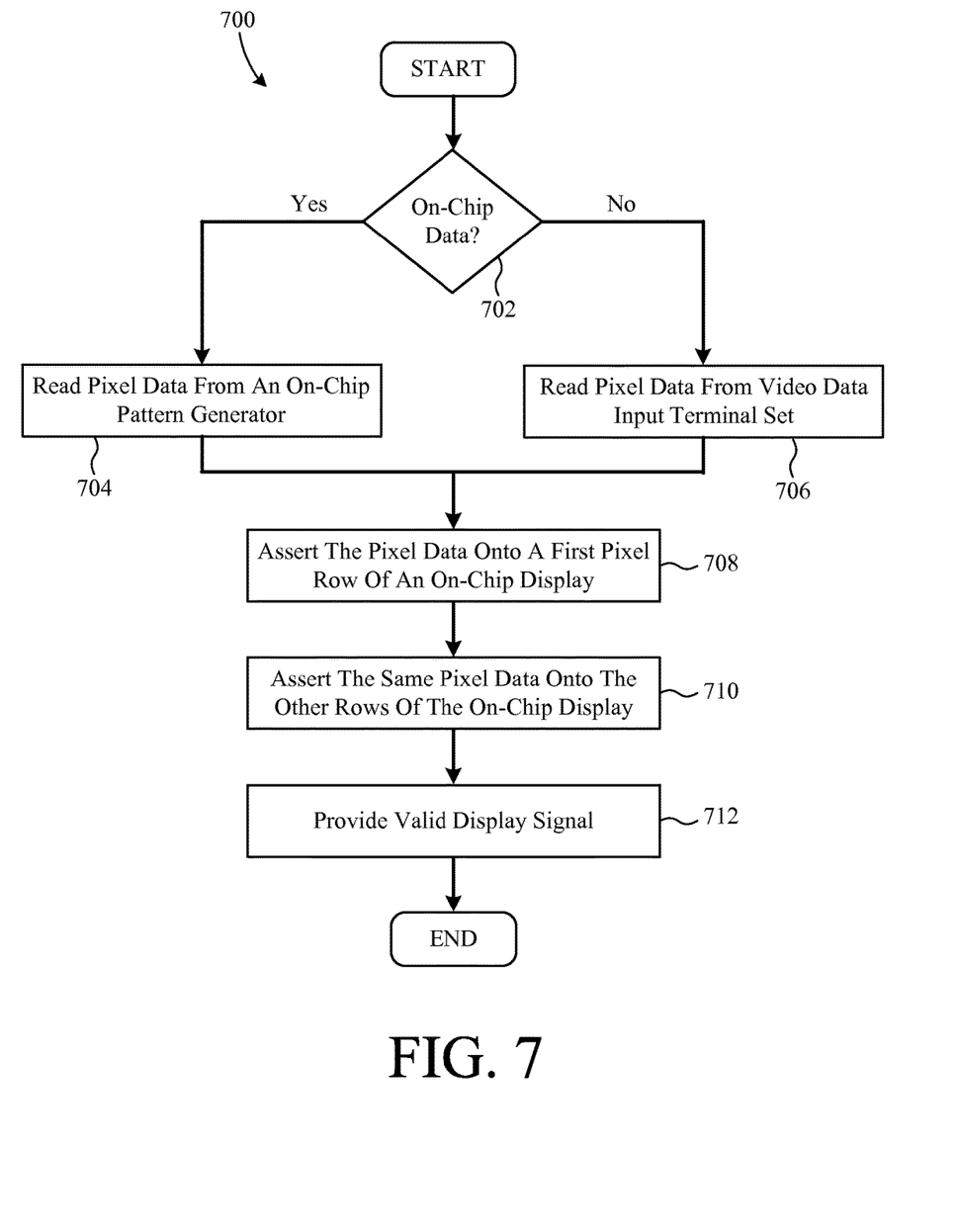
FIG. 7 is a flow-chart summarizing a method of operation for a projector panel.

FIG. 7 is a flow chart summarizing a method 700 for operating an LCOS panel. In a first step 702, it is determined whether data from an on-chip source is to be displayed. If so, then in a second step 704 pixel data is read from an on-chip pattern generator. Otherwise, in a third step 706, pixel data is read from a video data input terminal set from an off-chip source. After either second step 704 or third step 706, in a fourth step 708, the pixel data is asserted onto the pixels of a first pixel row of an on-chip display. Next, in a fifth step 710, the same pixel data is asserted on the pixels of the other rows of the on-chip display. Then, in a sixth step 712, a signal is provided to indicate that the display is valid (e.g., that the desired pattern is beings displayed).

Depending on the particular application, the data asserted on the other rows of the display in fifth step 710 can be different that the data asserted on the first row of the display in fourth step 708. However, in the structured light application described above by way of example, the same data will be loaded into each row of the display.

Figure 8:
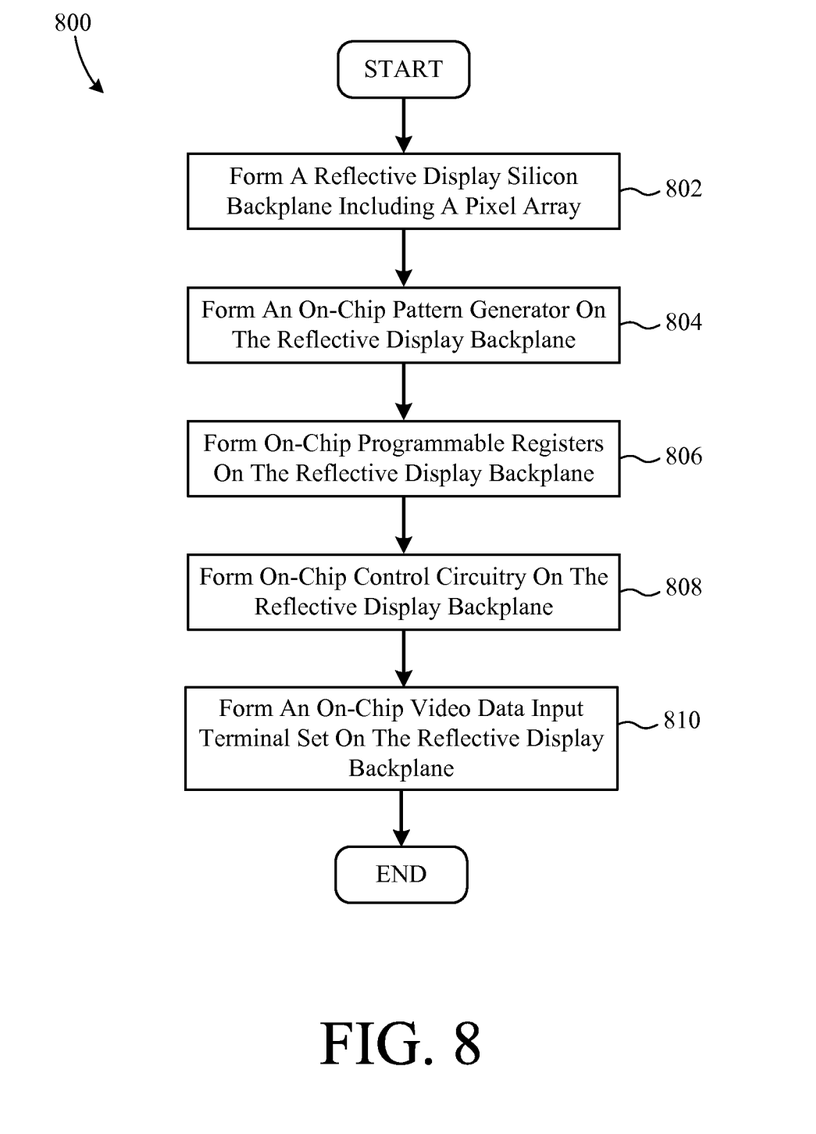
FIG. 8 is a flow-chart summarizing a method for manufacturing a projector panel.

FIG. 8 is a flow chart summarizing a method 800 for manufacturing an LCOS panel. In a first step 802, a reflective display silicon backplane including a pixel array is formed. Then, in a second step 804, an on-chip pattern generator is formed on the reflective display backplane. Next, in a third step 806, on-chip programmable registers are formed on the reflective display backplane. Then, in a fourth step 808, an on-chip control circuitry is formed on the reflective display backplane. Finally, in a fifth step 810, an on-chip video data input terminal set is formed on the reflective display backplane.

The description of particular embodiments of the present invention is now complete. Many of the described features may be substituted, altered or omitted without departing from the scope of the invention. For example, alternate structured light patterns (e.g., horizontal stripes, sinusoidal stripes, etc.), may be substituted for the vertical stripes. As another example, alternate projector types (e.g. transmissive projection systems) can be substituted for the LCOS projector. As yet another example, predetermined patterns for application specific projectors other than a structured light projector can be used. These and other deviations from the particular embodiments shown will be apparent to those skilled in the art, particularly in view of the foregoing disclosure.

We claim:
1. A projector panel comprising:
   a pixel array formed in an integrated circuit, said pixel array including a plurality of pixels arranged in columns and rows;
   a pattern generator formed in said integrated circuit and operative to output pixel data indicative of at least one predetermined pattern, said pattern generator being capable of outputting said pixel data without receiving video data from an external source; and control circuitry formed in said integrated circuit and operative to assert said pixel data on said pixels of said pixel array to display said predetermined pattern.

2. The projector panel of claim 1, wherein:

said projector panel is a liquid crystal on silicon panel; and said integrated circuit is a reflective silicon backplane.

3. The projector panel of claim 1, wherein said pattern generator includes non-volatile memory, said pixel data being stored in said non-volatile memory.

4. The projector panel of claim 3, wherein said pixel data indicative of said predetermined pattern includes no more than one intensity value for each column of pixels in said pixel array.

5. The projector panel of claim 4, wherein:

said at least one predetermined pattern is a structured light pattern; and said control circuitry is operative to assert said pixel data on said pixels of said pixel array by loading a sequence of data bits into a first row of said pixels of said pixel array and by loading the same sequence of data bits into the other rows of pixels of said pixel array during a single frame.

6. The projector panel of claim 1, wherein said control circuitry is operative to load a single row of data output from said pattern generator into each row of pixels during a single frame.

7. The projector panel of claim 6, wherein said control circuitry is operative to simultaneously load a single row of data output from said pattern generator into each row of pixels of said pixel array during a single frame.

8. The projector panel of claim 6, wherein said control circuitry is operative to sequentially load a same single row of data output from said pattern generator into each row of said pixels during a single frame.

9. The projector panel of claim 1, wherein:

said projector panel includes a video data input terminal set for receiving video pixel data from an external source;

said control circuitry is operative to selectively function in one of a first mode and a second mode;

said control circuitry is operative to assert said pixel data from said pattern generator when operating in said first mode; and said control circuitry is operative to display said video pixel data received via said video data input terminal set when operating in said second mode.

10. The projector panel of claim 9, further comprising at least one programmable register storing an operational parameter that at least partially determines whether said control circuitry operates in said first mode or said second mode.

11. The projector panel of claim 1, further comprising at least one programmable register storing an operational parameter that at least partially determines a time duration that said at least one predetermined pattern is displayed by said pixel array.

12. The projector panel of claim 1, further comprising at least one programmable register storing an operational parameter that at least partially determines how many different predetermined patterns can be output by said pattern generator.

13. The projector panel of claim 1, further comprising at least one programmable register storing an operational parameter that at least partially determines how many times said predetermined pattern is to be displayed by said pixel array during an operational cycle.

14. The projector panel of claim 1, further comprising a driver interface operative to receive pixel data from a separate liquid-crystal-on-silicon driver.

15. The projector panel of claim 1, wherein said pattern generator selectively outputs a plurality of pixel data sets, each pixel data set corresponding to a different predetermined display pattern.

16. The projector of claim 1, further comprising a camera interface operative to facilitate the coordination of the display of said at least one predetermined pattern with image capture by a camera.

17. The projector panel of claim 1, wherein:

said projector panel is a liquid-crystal-on-silicon projector panel;

said pattern generator includes a non-volatile memory, said pixel data being stored in said non-volatile memory;

said control circuitry is operative to load a single row of data output from said pattern generator into each of said rows of pixels during a single frame;

said projector panel additionally includes programmable registers;

said projector panel additionally includes a video driver interface; and said projector panel additionally includes a camera interface.

18. The projector panel of claim 1, wherein said projector panel is free of any external pixel data input configured to receive pixel data from an off-chip source.

19. The projector panel of claim 1, wherein said pattern generator includes at least one control algorithm operative to output said pixel data indicative of said at least one predetermined pattern.

20. The projector panel of claim 19, wherein said at least one control algorithm is operative to generate at least one predetermined sequence of data bits corresponding to said at least one predetermined pattern.

21. The projector panel of claim 1, wherein said pattern generator determines the content of said pixel data.

22. The projector panel of claim 1, wherein:

said pixel array, said pattern generator, and said control circuitry are formed in said integrated circuitry of a chip; and said external source is an off-chip source.

23. The projector panel of claim 1, wherein:

said pixel array, said pattern generator, and said control circuitry are formed in said integrated circuitry of a liquid-crystal-on-silicon (LCOS) chip;

said at least one predetermined pattern comprises a predetermined structured light pattern associated with at least one specific application of said projector panel;

said pattern generator is operative to generate said pixel data indicative of said at least one predetermined structured light pattern locally on said LCOS chip, whereby said pixel data need not traverse an off-chip interface configured to communicate with an off-chip LCOS driver; and said control circuitry is operative to assert said pixel data on said pixels of said pixel array to display said at least one predetermined structured light pattern.

24. A method for manufacturing a projector panel, said method comprising:

forming a reflective display integrated circuit chip including a plurality of pixels arranged in an array of columns and rows;

forming a pattern generator in said reflective display integrated circuit chip, said pattern generator being operative to output pixel data indicative of at least one predetermined pattern and being capable of outputting said pixel data without receiving video data from an external source; and forming control circuitry in said reflective display integrated circuit chip, said control circuitry being operative to assert said pixel data on said pixels of said reflective display.

25. The method of claim 24, further comprising applying a liquid crystal layer over said reflective display integrated circuit chip.

26. The method of claim 25, wherein said step of forming said pattern generator includes:

forming non-volatile memory on said reflective display integrated circuit chip; and storing said pixel data in said non-volatile memory.

27. The method of claim 26, wherein said pixel data indicative of said at least one predetermined pattern includes no more than one intensity value for each column of pixels in said array.

28. The method of claim 27, wherein:

said at least one predetermined pattern is a structured light pattern; and said control circuitry is configured to assert said pixel data on said pixels of said array by loading a sequence of data bits into a first row of said pixels of said array and by loading the same sequence of data bits into the other rows of pixels of said array during a single frame.

29. The method of claim 24, further comprising configuring said control circuitry to load a single row of data output from said pattern generator into each row of said plurality of pixels during a single frame.

30. The method of claim 29, further comprising configuring said control circuitry to simultaneously load a single row of data output from said pattern generator into each of said rows of pixels during a single frame.

31. The method of claim 29, further comprising configuring said control circuitry to sequentially load a same single row of data output from said pattern generator into each of said rows of pixels during a single frame.

32. The method of claim 24, wherein forming a video data input terminal set on said reflective display integrated circuit chip for receiving video pixel data from an off-chip source;

configuring said control circuitry to selectively operate in one of a first mode and a second mode;

configuring said control circuitry to assert pixel data from said pattern generator when operating in said first mode; and configuring said control circuitry to assert said video pixel data received via said video data input terminal set when operating in said second mode.

33. The method of claim 32, further comprising:

forming at least one programmable register on said reflective display integrated circuit chip; and configuring said control circuitry to determine whether said control circuitry operates in said first mode or said second mode depending at least in part on an operational parameter stored in said at least one programmable register.

34. The method of claim 24, further comprising:

forming at least one programmable register on said reflective display integrated circuit chip; and configuring said control circuitry to determine a time duration that said at least one predetermined pattern is displayed on said pixels of said reflective display depending at least in part on an operational parameter stored in said at least one programmable register.

35. The method of claim 24, further comprising:

forming at least one programmable register on said reflective display integrated circuit chip; and configuring said control circuitry to determine how many different predetermined patterns can be read from said pattern generator depending at least in part on an operational parameter stored in said at least one programmable register.

36. The method of claim 24, further comprising:

forming at least one programmable register on said reflective display integrated circuit chip; and configuring said control circuitry to determine how many times said predetermined pattern is to be displayed by said pixels of reflective display during an operational cycle depending at least in part on an operational parameter stored in said at least one programmable register.

37. The method of claim 24, further comprising forming an on-chip driver interface operative to receive pixel data from a separate liquid-crystal-on-silicon driver.

38. The method of claim 24, further comprising forming a camera interface on said reflective display integrated circuit chip.

39. The method of claim 24, wherein said reflective display integrated circuit chip is free of any external pixel data input configured to receive pixel data from an off-chip source.

40. A non-transitory electronically readable medium having code embodied therein for causing an electronic device to:

read pixel data corresponding to at least one predetermined pattern from an on-chip pattern generator without receiving video data from an external source; and assert said pixel data on reflective pixel electrodes of an on-chip display.

41. The non-transitory electronically readable medium of claim 40, wherein:

said on-chip display comprises a reflective silicon backplane defining a plurality of pixels; and said on-chip pattern generator is formed in said reflective silicon backplane.

* * * * *

UNITED STATES PATENT AND TRADEMARK OFFICE
CERTIFICATE OF CORRECTION

PATENT NO.         : 9,759,554 B2
APPLICATION NO.    : 13/958167
DATED              : September 12, 2017
INVENTOR(S)        : Ng et al.

Page 1 of 1

It is certified that error appears in the above-identified patent and that said Letters Patent is hereby corrected as shown below:

In Column 14 Claim 36, Line 28, replace "said pixels of reflective display" with --said pixels of said reflective display--.

Signed and Sealed this
Fourteenth Day of November, 2017

Joseph Matal
*Performing the Functions and Duties of the
Under Secretary of Commerce for Intellectual Property and
Director of the United States Patent and Trademark Office*